United States Patent
Yasuda et al.

(10) Patent No.: US 12,375,807 B2
(45) Date of Patent: Jul. 29, 2025

(54) EVALUATION METHOD FOR IMAGE STABILIZATION EFFECT OF IMAGING APPARATUS, EVALUATION DEVICE, AND PROGRAM STORAGE MEDIUM

(71) Applicant: CANON KABUSHIKI KAISHA, Tokyo (JP)

(72) Inventors: Ryuichiro Yasuda, Tokyo (JP); Junichi Saito, Kanagawa (JP); Mitsuhiro Saito, Kanagawa (JP); Shimpei Itagaki, Tokyo (JP); Go Naito, Kanagawa (JP); Kyosuke Sato, Kanagawa (JP); Tomomi Uesugi, Kanagawa (JP); Naoki Nomura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 18/068,646

(22) Filed: Dec. 20, 2022

(65) Prior Publication Data
US 2023/0224581 A1 Jul. 13, 2023

(30) Foreign Application Priority Data
Jan. 7, 2022 (JP) .................. 2022-001809

(51) Int. Cl.
*H04N 23/63* (2023.01)
*G06T 5/70* (2024.01)
(Continued)

(52) U.S. Cl.
CPC ............. *H04N 23/682* (2023.01); *G06T 5/70* (2024.01); *G06V 10/60* (2022.01); *G06V 10/758* (2022.01); *G06V 10/761* (2022.01)

(58) Field of Classification Search
CPC ................ H04N 23/63; H04N 23/633; H04N 23/68–6811; G06T 7/20–285
(Continued)

(56) References Cited

U.S. PATENT DOCUMENTS

| 9,183,456 B2 * | 11/2015 | Kusaka ................. G06V 10/44 |
| 2020/0351444 A1 * | 11/2020 | Cha ........................ H04N 23/68 |

FOREIGN PATENT DOCUMENTS

| CN | 113596440 A | * 11/2021 | ........... H04N 17/002 |
| JP | H07056218 A | 3/1995 | |

(Continued)

OTHER PUBLICATIONS

The above foreign patent documents were cited in the Jun. 3, 2025 Japanese Office Action, a copy of which is enclosed without an English Translation, that issued in Japanese Patent Application No. 2022-001809.

*Primary Examiner* — Anthony J Daniels
(74) *Attorney, Agent, or Firm* — Cowan, Liebowitz & Latman, P.C.

(57) ABSTRACT

An evaluation method for an image stabilization effect of an imaging apparatus comprising: acquiring a first image obtained by imaging an object in a state in which the imaging apparatus is vibrated; acquiring a second image obtained by imaging the object in a state in which the imaging apparatus is stationary; and calculating an evaluation value indicating an image stabilization effect in a peripheral region of the imaging apparatus, based on a difference in blur amounts between the first image and the second image in the peripheral region deviated from the center of an optical axis.

12 Claims, 14 Drawing Sheets

(51) Int. Cl.
    *G06T 7/20*          (2017.01)
    *G06V 10/60*       (2022.01)
    *G06V 10/74*       (2022.01)
    *G06V 10/75*       (2022.01)
    *H04N 23/68*      (2023.01)

(58) Field of Classification Search
    USPC .................................................. 348/208.99
    See application file for complete search history.

(56) References Cited

FOREIGN PATENT DOCUMENTS

| | | |
|---|---|---|
| JP | 2001165622 A | 6/2001 |
| JP | 2012142978 A | 7/2012 |
| JP | 2013025267 A | 2/2013 |
| JP | 2018182564 A | 11/2018 |
| JP | 2019194792 A | 11/2019 |
| JP | 2020108120 A | 7/2020 |
| JP | 2021027584 A | 2/2021 |
| JP | 2022112842 A | 8/2022 |
| JP | 2022122815 A | 8/2022 |
| JP | 2023068831 A | 5/2023 |
| JP | 2023070383 A | 5/2023 |
| WO | 2013/076964 A1 | 5/2013 |
| WO | 2013076965 A1 | 5/2013 |
| WO | 2013114896 A | 8/2013 |
| WO | 2021220605 A | 11/2021 |

\* cited by examiner

EVALUATION METHOD FOR IMAGE STABILIZATION EFFECT OF IMAGING APPARATUS, EVALUATION DEVICE, AND PROGRAM STORAGE MEDIUM

BACKGROUND OF THE INVENTION

Field of the Invention

The present invention relates to an evaluation method for an image stabilization effect of an imaging apparatus, an evaluation device, and a program storage medium.

Description of the Related Art

As a method for evaluating an image stabilization effect of an imaging apparatus, a method is known in which an image is obtained while vibrating the imaging apparatus in an axial direction that is orthogonal to an optical axis and the image stabilization effect of the imaging apparatus is evaluated based on the degree of deterioration of the image (for example, PCT International Publication No. WO 2013/076964).

However, the evaluation of the image stabilization effect in PCT International Publication No. WO 2013/076964 assumes that the center of the image is the evaluation target. Therefore, there is a demand for a method for more appropriately evaluating the image stabilization effect of, for example, the correction of a rotational blur (roll blur) around the optical axis, and image stabilization in a peripheral region other than the center of the imaging surface, which can be realized by imaging surface image stabilization in which the imaging element is moved onto the vertical plane of the optical axis.

SUMMARY OF THE INVENTION

An evaluation method for an image stabilization effect of an imaging apparatus according to one embodiment of the present invention comprises: acquiring a first image obtained by imaging an object in a state in which the imaging apparatus is vibrated; acquiring a second image obtained by imaging the object in a state in which the imaging apparatus is stationary; and calculating an evaluation value indicating an image stabilization effect in a peripheral region of the imaging apparatus based on a difference in blur amounts between the first image and the second image in the peripheral region deviated from the center of an optical axis.

Further features of the present invention will become apparent from the following description of exemplary embodiments with reference to the attached drawings.

DESCRIPTION OF THE EMBODIMENTS

Hereinafter, embodiments for carrying out the present invention will be described with reference to the drawings. However, the embodiments below do not limit the claimed invention, and not all the features described in the embodiments below are essential to the present invention.

First Embodiment

Figure 1:
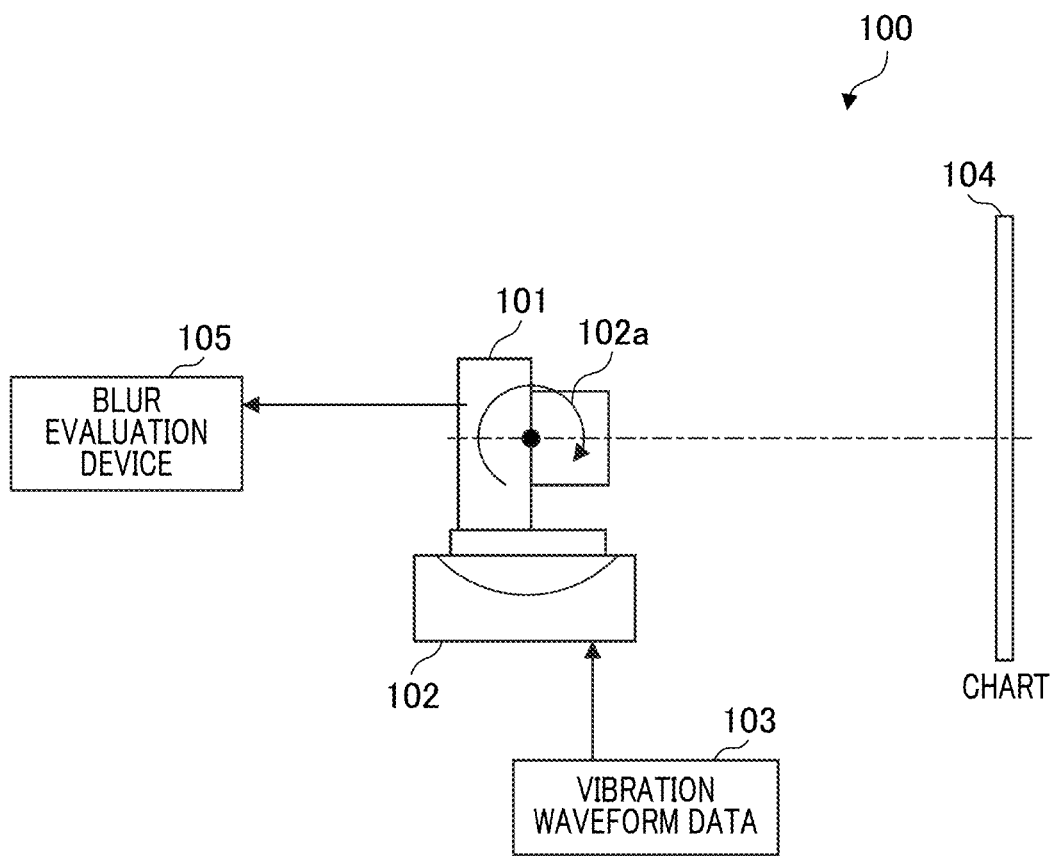
FIG. 1 is a schematic diagram showing an example of a configuration of an evaluation system in the first embodiment.

FIG. 1 is a schematic diagram showing an example of a configuration of an evaluation system in the first embodiment. An evaluation system 100 is a system that measures an image stabilization effect of an imaging apparatus 101 (camera system). The imaging apparatus 101, which serves as a device to be measured, is fixed to a vibration table 102. The vibration table 102 mechanically generates vibrations that simulate camera shake by a human based on vibration waveform data 13 that are being input, and vibrates the imaging apparatus 101. The vibration table 102 performs vibration in the pitch direction (around the axis perpendicular to the sheet of FIG. 1) indicated by an arrow 102a and in the yaw direction (around the axis in the vertical direction in FIG. 1). Additionally, in the vibration table 102, vibration in the roll direction (around the axis in the horizontal directions in FIG. 1) can be applied as needed. Furthermore, in the vibration table 102, a control for switching between a vibration state and a stationary state is enabled.

The imaging apparatus 101, which has been fixed to the vibration table 102, images a chart 104 that is disposed to face the imaging apparatus 101 to serve as an object. In the description below, the chart 104 that is imaged for measurement of the image stabilization effect is also referred to as a "first object". A measurer adjusts the positions of the imaging apparatus 101 and the chart 104 such that a desired region of the chart 104 is captured on an imaging surface of the imaging apparatus 101.

Figure 5A:
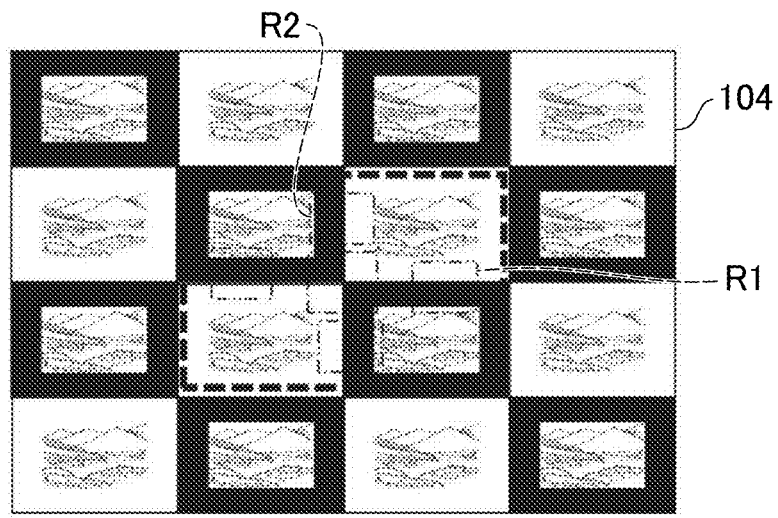
FIGS. 5A to 5C illustrate examples of a chart.

As shown in FIG. 5A, which is to be described below, the chart 104 includes a plurality of white and black band-like portions having a constant width in the horizontal and vertical directions, and a color natural image portion. In the chart 104 shown in FIG. 5A, 16 natural image portions are arranged in a 4×4 array, and the band-like portions are arranged on the outer periphery of each of the natural image portions such that they form rectangular frames. In the chart 104, white frames and black frames are arranged in a checkered pattern such that the colors of adjacent band-like portions are different.

In a typical evaluation method for an image stabilization effect, the image deterioration due to vibration is evaluated by detecting the contrast of the black-and-white boundary line by using an image obtained by imaging the black-and-white boundary line in the center part of the chart 104.

An image of the chart 104 imaged by the imaging apparatus 101 during vibration is input to a blur evaluation device 105. The blur evaluation device 105 is, for example, a computer that executes an image analysis software. The blur evaluation device 105 detects the contrast of the image of the chart 104 imaged by the imaging apparatus 101 and measures the deterioration of the image due to vibration.

Figure 2:
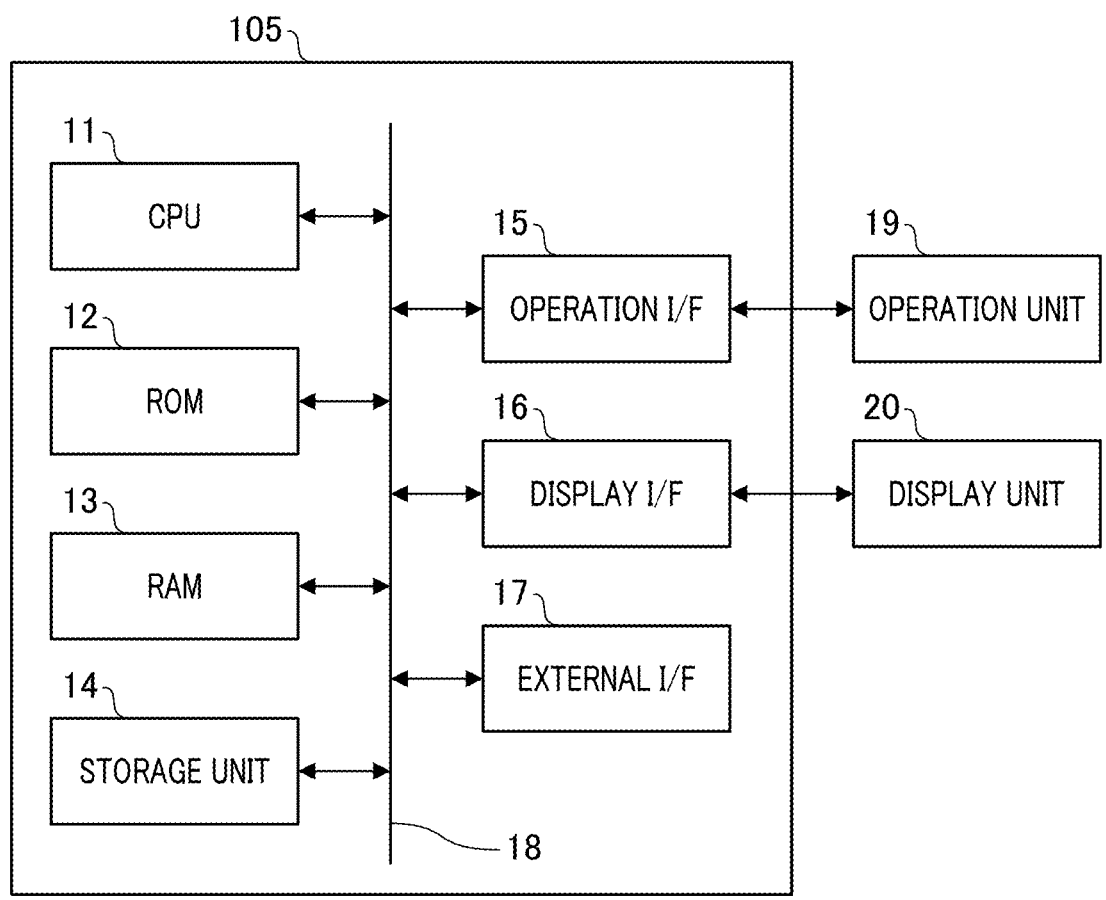
FIG. 2 illustrates an example of a configuration of hardware of a blur evaluation device.

FIG. 2 illustrates an example of a configuration of the hardware of the blur evaluation device 105. The blur evaluation device 105 has a CPU 11, a ROM 12, a RAM 13, a storage unit 14, an operation I/F 15, a display I/F 16, and an external I/F 17. Each element of the blur evaluation device 105 is connected to each other via a system bus 18. Note that CPU is an abbreviation for "Central Processing Unit", ROM is an abbreviation for "Read Only Memory", and RAM is an abbreviation for "Random Access Memory".

The CPU 11 starts an OS (Operating System) by a boot program stored in the ROM 12. The CPU 11 executes various processing to be described below by executing a program of the image analysis software stored in the storage unit 14 on the OS. The RAM 13 is used as a main memory of the CPU 11 and a temporary region such as a work area and the like.

The operation I/F 15 is an interface that connects the CPU 11 and an operation unit 19 and transmits information input from the operation unit 19 to the CPU 11. The operation unit 19 is a device that receives the measurer's input to the blur evaluation device 105, and is configured by, for example, a keyboard and a pointing device.

The display I/F 16 is an interface that connects the CPU 11 and a display unit 20 and outputs image data to be displayed to the display unit 20. The display unit 20 is a device that outputs an operation screen of the blur evaluation device 105 and is configured by a display device, for example, a liquid crystal display.

The external I/F 17 is an interface for acquiring image data and various types of information of the imaging apparatus 101 that serves as a device to be measured. The external I/F 17 may be configured to acquire information through wired or wireless communication or may be configured to read information via a storage medium that is attachable and detachable.

Figure 3:
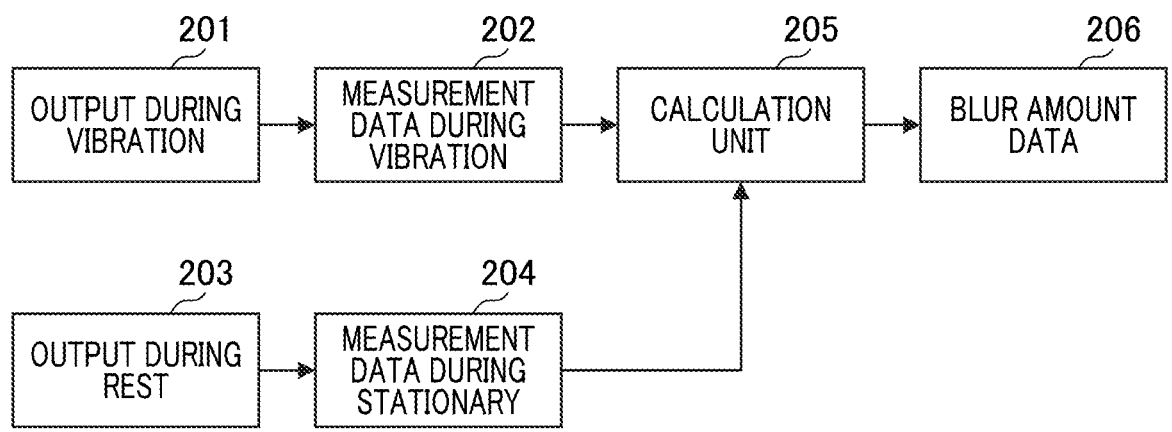
FIG. 3 illustrates an example of software processing of the blur evaluation device.

FIG. 3 illustrates an example of the software processing for the blur evaluation device 105. The processing shown in FIG. 3 is realized by a program that is executed by the blur evaluation device 105. The blur evaluation device 105 acquires each of an output during a vibration 201 and an output during a stationary 203 from the imaging apparatus 101.

The output during the vibration 201 includes a plurality of image data obtained by the imaging apparatus 101 imaging the chart 104 in a state in which the vibration table 102 is set to a vibration state. During the imaging in the vibration state, imaging is performed under a plurality of imaging conditions determined by exposure time or brightness.

The measurement data during a vibration 202 is measurement data during a vibration generated when the blur evaluation device 105 calculates a blur amount for the image of the output during vibration 201.

The output during a stationary 203 includes a plurality of image data obtained by the imaging apparatus 101 imaging the chart 104 in a state in which the vibration table 102 is set to a stationary state. Imaging in the stationary state is performed under a plurality of imaging conditions that are determined by exposure time or brightness.

Measurement data during a stationary 204 is measurement data during a stationary generated when the blur evaluation device 105 calculates a blur amount for the image of the output during the stationary 203. In the evaluation of the image stabilization, if out-of-focus is overlapped on the image, it is difficult to accurately calculate the blur amount that was caused by shaking in an image. Therefore, the measurement data during the stationary 204 is used as correction information when the blur amount is calculated.

A calculation unit 205 calculates blur amount data 206 by calculation processing such as subtraction by using the measurement data during the vibration 202 and the measurement data during the stationary 204.

Figure 4A:
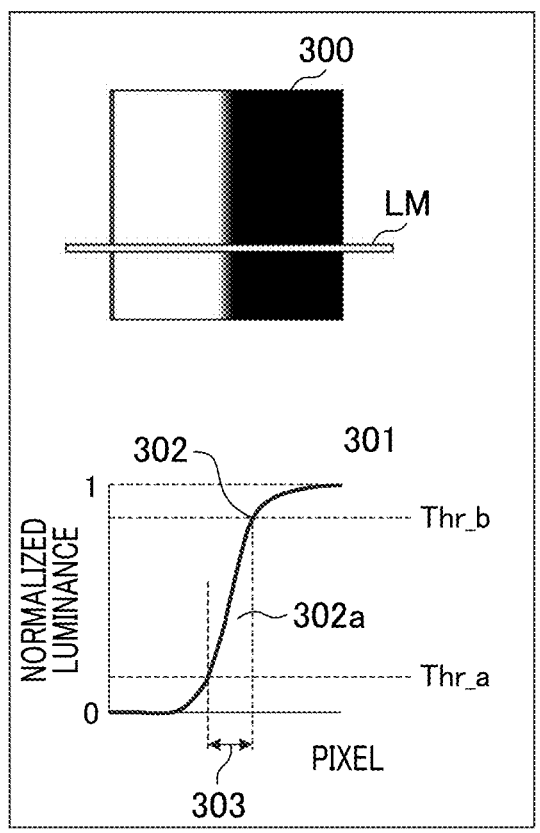
FIGS. 4A and 4B illustrate an example of calculation of a blur amount or an out-of-focus amount by image contrast evaluation.
Figure 4B:
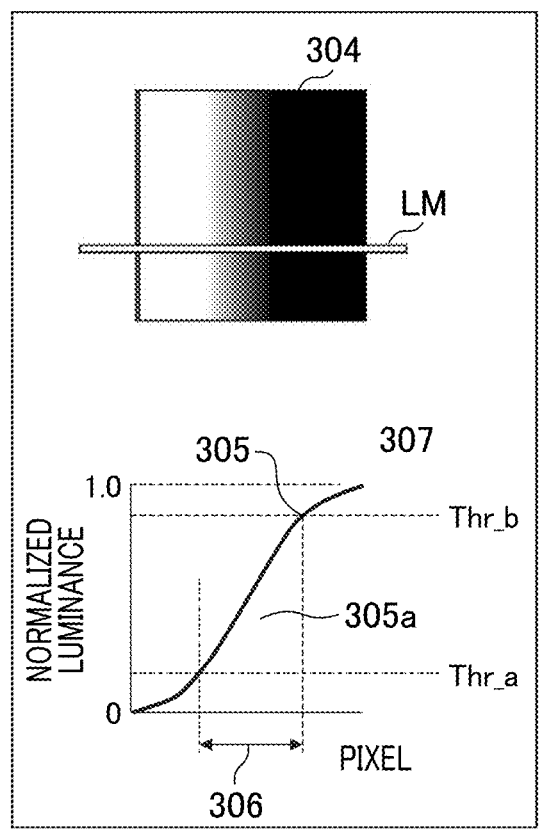

FIGS. 4A and 4B illustrate an example of the calculation of a blur amount or an out-of-focus amount by image contrast evaluation. An image 300 in FIG. 4A is an image obtained by imaging the black-and-white boundary portion of the chart 104 in a state in which there is no camera shake. LM indicates a luminance extraction line of the image 300.

Additionally, a graph 301 in FIG. 4A shows a luminance change in the horizontal direction of the image 300 corresponding to the luminance extraction line LM. The vertical axis of the graph 301 shows the brightness (luminance value) of the normalized pixel, and the horizontal axis of the graph 301 shows the pixel position in the normal direction of the black-and-white boundary line. Additionally, a waveform of the luminance change in the graph 301 is shown by reference numeral 302.

Thr_a in the graph indicates a threshold on the lower limit side of the luminance value. Thr_a is a value that is a constant or higher value with respect to the lower limit value of the luminance value. Additionally, Thr_b in the graph indicates a threshold on the upper limit side of the luminance value. Thr_b is a value that is a constant or lower value with respect to the upper limit value of the luminance value.

As shown in the graph 301 in FIG. 4A, the luminance change waveform 302 changes at a predetermined tilt 302a at the portion of the boundary between white and black. The pixel width from the position where the luminance value of the waveform 302 is the threshold Thr_a on the lower limit side to the position where the luminance value is the threshold Thr_b on the upper limit side is the change amount 303 of the out-of-focus amount or the blur amount in FIG. 4A.

An image 304 in FIG. 4B is an image obtained by imaging the black-and-white boundary portion of the chart 104 in a state in which the camera was in a vibration state. As compared to the image 300 in FIG. 4A, the image 304 in FIG. 4B is an image in which more blurring occurs. LM indicates a luminance extraction line of the image 304.

Additionally, a graph 307 in FIG. 4B shows a luminance change in the horizontal direction of the image 304 corresponding to the luminance extraction line LM. The vertical axis, the horizontal axis, Thr_a and Thr_b in the graph 307 are similar to those of the graph 301 in FIG. 4A.

In FIG. 4B, the waveform of the luminance change in the graph 307 is shown by reference numeral 305. The pixel width from the position where the luminance value of the waveform 305 is the threshold Thr_a on the lower limit side to the position where the luminance value is the threshold Thr_b on the upper limit side is a change amount 306 of the out-of-focus amount or the blur amount in FIG. 4B. The change amount 306 in the vibration state is higher than the change amount 303 in the stationary state in FIG. 4A. Hence, it is understood that the performance evaluation of the image stabilization effect with respect to the shaking of the imaging apparatus 101 is enabled by using the blur amounts of the images in the stationary state and the vibration state.

Meanwhile, in the conventional evaluation of an image stabilization effect, only the blur in the central portion of the captured image is evaluated, and the evaluation of the image stabilization performance with respect to roll blur or blur in the periphery of the image is not supported. Hereinafter, the evaluation of the image stabilization effect with respect to roll blur in the first embodiment will be described.

In the evaluation of the image stabilization effect in the first embodiment, an image obtained by imaging the peripheral portion of the chart 104 is used so that the rotation blur is evaluated, instead of the central portion of the chart 104. Specifically, in the peripheral portion of the chart 104, a region obtained by imaging a boundary line that vertically divides the black-and-white band-like portion (hereinafter, also referred to as a "region R1"), and a region obtained by imaging a boundary line that horizontally divides the black-and-white belt-like portion (hereinafter, also referred to as a "region R2") are used. The region R1 is an example of a first pattern in which contrast in the vertical direction can be detected and the region R2 is an example of a second pattern in which contrast in the horizontal contrast can be detected.

However, there may be cases in which the black-and-white intersection point is present only in the center part of the screen within the imaging range of the imaging apparatus 101, depending on the specifications of the devices to be measured. Accordingly, in the evaluation of the image stabilization effect in the first embodiment, a blur amount for the image in the horizontal direction of the imaging apparatus 101 (hereinafter, also referred to as a "second blur amount") is acquired from a region R2 (horizontal boundary lines) located at a position deviated vertically from the center part of the chart 104 by an image height desired to be measured. Similarly, a blur amount for the image in the vertical direction of the imaging apparatus 101 (hereinafter, also referred to as a "first blur amount") is acquired from a region R1 (vertical boundary lines) located at a position deviated horizontally from the center part of the chart 104 by an image height desired to be measured. The calculation method of the first blur amount and the second blur amount is the same as the calculation method of the blur amount described with reference to FIGS. 4A and 4B.

The number of locations for measuring the first blur amount and the second blur amount may be one each in the horizontal direction and the vertical direction of the chart 104. Alternatively, the averaging processing may be performed by acquiring the first blur amount at two locations in the horizontal direction of the chart 104, and similarly, the averaging processing may be performed by acquiring the second blur amount at two locations in the vertical direction of the chart 104.

Subsequently, the combining processing for combining the first blur amount and the second blur amount are performed, and the blur evaluation device 105 calculates a blur amount for the image height to be measured as an evaluation value. The blur amount for the image height to be measured, which is obtained by combining the first blur amount and the second blur amount, is also referred to as a "first evaluation value". Various correction processing to be described below may be performed on the first evaluation value.

By the above method, the evaluation of a roll blur can be performed while using the chart 104 that is the same as the conventional one. Additionally, even if rolling vibration is performed on the imaging apparatus 101 on the vibration table 102 during the blur measurement, the influence of the center part of the chart 104 that is located substantially at the center of the screen on the image is quite small, and as a result, conventional blur measurement can also be performed at the same time.

Figure 5B:
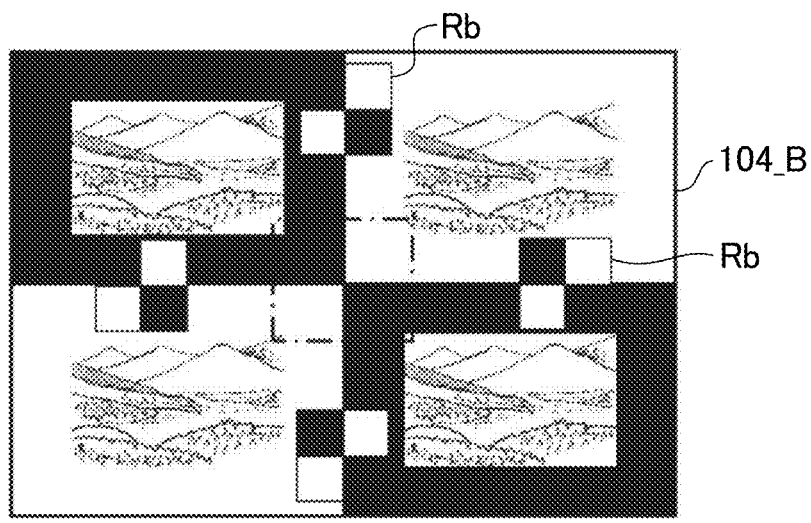
Figure 5C:
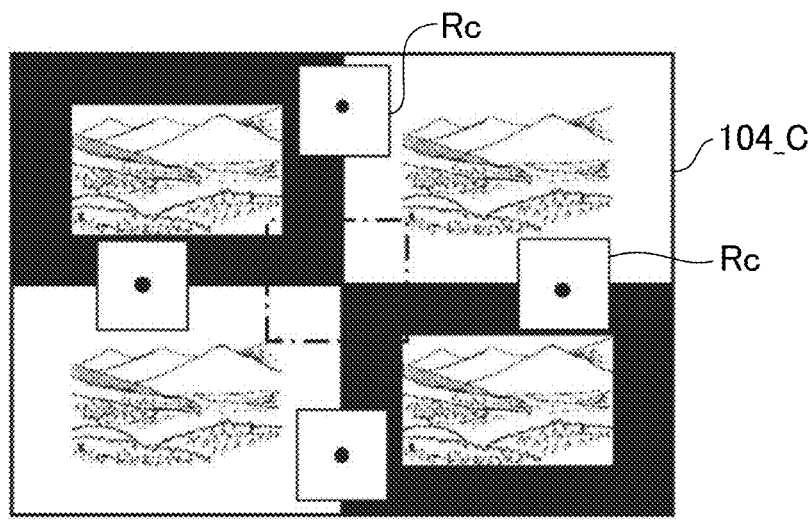

Additionally, in a typical evaluation method, the region used for evaluation in the chart 104 in FIG. 5A is only the central portion. In the case of the method in the first embodiment, a chart 104_B in which a black-and-white intersection point pattern Rb for roll blur evaluation is added to a position deviated from the center of the chart may be used, as shown in FIG. 5B. Alternatively, a chart 104_C in which a black point pattern Re for roll blur evaluation is added to a position deviated from the center of the chart may be used, as shown in FIG. 5C.

Image Height Influence Measurement

In general, it is known that in an image captured by the imaging apparatus 101, a difference in image quality can occur between an image in a central region in the vicinity of the center of the optical axis and an image in a peripheral region where the image height is high, due to differences in the appearance of various optical aberrations and the like. Therefore, if the blurring in the central region and the peripheral region are evaluated by using the same measurement method and index, appropriate blur evaluation may become difficult. Therefore, in the first embodiment, the image height influence measurement below is executed in order to suppress the influence due to differences in image height when the blurring of the peripheral region is measured. Examples of image height influence measurement include luminance distribution measurement, resolution measurement, and distortion measurement. Note that not all of the above measurements are essential, and one or two measurements may be selectively performed.

Luminance Distribution Measurement

Figure 6A:
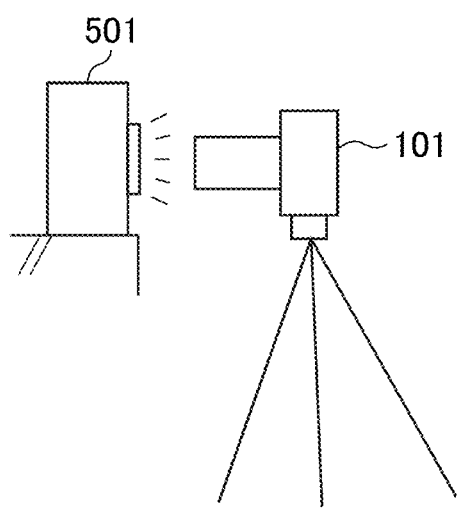
FIGS. 6A and 6B illustrate luminance distribution measurement.
Figure 6B:
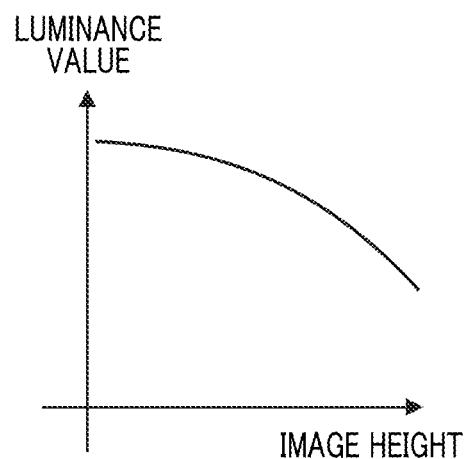

FIGS. 6A and 6B illustrate, from among the image height influence measurements, luminance distribution measurement for suppressing the influence of the decrease in marginal illumination. FIG. 6A illustrates a schematic view of luminance distribution measurement.

In the luminance distribution measurement, a uniform luminance surface is imaged by the imaging apparatus 101, which serves as a device to be measured, and a luminance distribution that corresponds to the image heights in the central region and the peripheral region of the imaging apparatus 101 is acquired. Specifically, a luminance box 501 in which a uniform luminance surface having a uniform luminance can be configured is imaged by the imaging apparatus 101, and the luminance distribution corresponding to the image heights is acquired, as shown in FIG. 6A. In the imaging in the luminance distribution measurement, the camera shake correction function of the imaging apparatus 101 is set to off, and the imaging is performed under conditions in which the luminance of the central region is properly exposed. The object imaged in the luminance distribution measurement is an example of the second object. Note that the object to be imaged in the luminance distribution measurement is not limited to the luminance box 501 if the imaging surface of the imaging apparatus 101 can be imaged with a uniform luminance, and the object may be, for example, an integrating sphere.

FIG. 6B is an example of a graph of luminance distributions obtained in the luminance distribution measurement. In FIG. 6B, the horizontal axis indicates an image height, and the vertical axis indicates a luminance value. Additionally, the intersection of the horizontal axis and the vertical axis corresponds to the center image height in the vicinity of the center of the optical axis. In the graph in FIG. 6B, a profile of the luminance distribution according to the difference in image heights between the central region and the peripheral region can be obtained.

In general, when the imaging apparatus 101 captures a formed image of the light flux that has passed through an imaging optical system, the quantity of incident light reduces according to what is referred to as the cosine fourth law in the peripheral region where the image height is high, and as a result, the luminance value in the peripheral region is lower than that in the central region. As shown in FIG. 6B, since the luminance value in the peripheral region is lower than that in the central region, an object that is appropriately captured in white in the central region is expressed in gray in the peripheral region. Therefore, there is a difference in the contrast values for the edge chart between the case in which the black- and white edge charts are imaged in the central region and the case in which they are imaged in the peripheral region.

In the first embodiment, a blur evaluation method using edge contrast (hereinafter, also referred to as an "edge contrast method") is applied, as shown in FIGS. 4A and 4B. However, the decrease in marginal illumination due to the image height described above is one of the factors that causes errors in the evaluation results of the edge contrast method.

Therefore, performing luminance distribution measurement prior to the evaluation of the image stabilization effect results in the suppression of errors caused by the decrease in marginal illumination. Since the difference in image height in the evaluation result that is caused by the edge contrast method is canceled by, for example, correcting the measurement result for the blur by using a profile of the luminance distribution according to the difference in image height, the blur amount in the peripheral region can be treated as equivalent to that in the central region. Alternatively, using the profile of the luminance distribution according to the difference in image height as reference information and attaching it in association with the evaluation result of the image stabilization effect also results in an appropriate determination of the evaluation in the case in which correction has not been performed.

When the correction is performed by using the profile of the luminance distribution according to the difference in image height, a ratio of the luminance value (central luminance/evaluation image high luminance) in a certain peripheral region is calculated by the luminance value in the center of the imaging surface of the imaging apparatus 101 and the evaluated image height. Then, the above ratio of the luminance values is used as correction data and can be multiplied by the luminance value of the edge to be evaluated for normalization.

Additionally, in some models of the imaging apparatus 101, it is also possible to store the decrease in marginal illumination in advance and perform luminance correction by multiplying an inverse ratio of the luminance value, and in this case, observation may be performed in a state in which the decrease in marginal illumination is reduced. In the function of this model, if it is determined that the decrease in marginal illumination does not affect the evaluation result of the edge contrast method, the luminance distribution measurement can be omitted.

(Resolution Measurement)

Figure 7A:
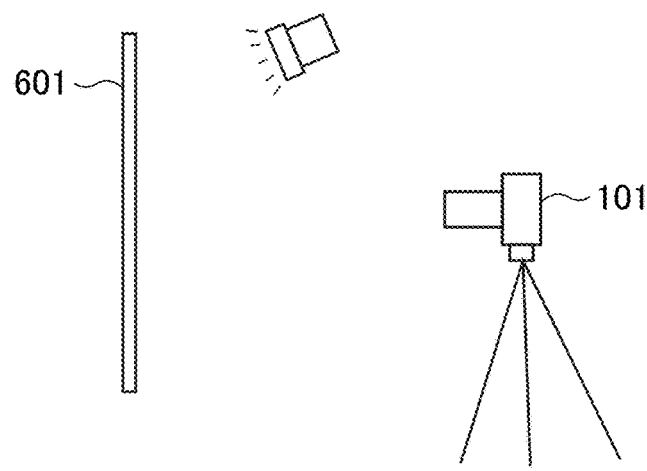
FIGS. 7A to 7C illustrate resolution measurement.
Figure 7B:
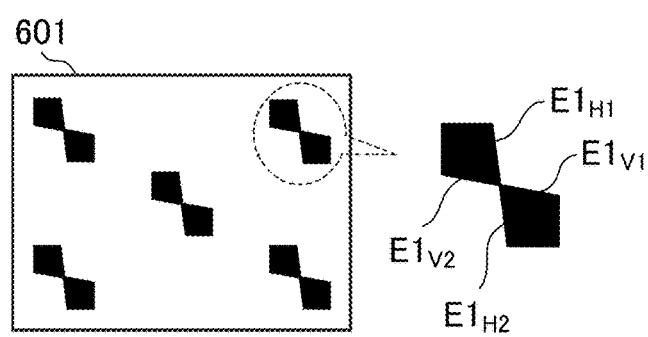
Figure 7C:
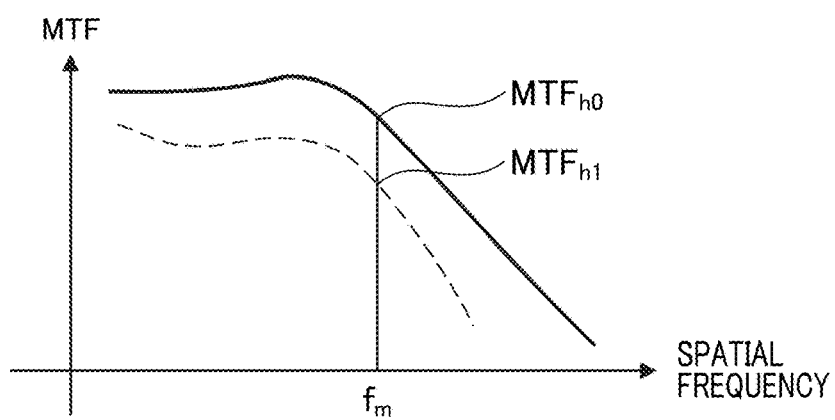

FIGS. 7A to 7C illustrate, from among the image height influence measurements, a resolution measurement in which the influence of aberrations such as coma aberration, astigmatism, field curvature, and chromatic aberration of magnification are measured. FIG. 7A illustrates a schematic view of the resolution measurement.

In the resolution measurement, the imaging apparatus 101, which serves as a device to be measured, images an SFR chart 601 and acquires information regarding the resolution in the central region and the peripheral region of the imaging apparatus 101, as shown in FIG. 7A. In the imaging of the resolution measurement, the camera shake correction function of the imaging apparatus 101 is set to off, and the SFR chart 601 is illuminated under appropriate conditions.

FIG. 7B illustrates an example of the SFR chart 601, and the right side in FIG. 7B shows an enlarged chart pattern. The SFR chart imaged in the resolution measurement is an example of the second object. The SFR chart 601 includes a plurality of edge chart patterns having a tilt of several degrees to the horizontal direction and the vertical direction, as shown in FIG. 7B. The chart patterns are arranged at positions corresponding to the center and peripheral regions of the imaging range, and the resolution at each image height can be measured by imaging the SFR chart 601. In the SFR chart 601 in FIG. 7B, the resolution can be measured in the form of MTF for a total of five locations, that is, one location in the central region and four locations in the peripheral region.

Each of the chart patterns of the SFR chart 601 has a shape in which the resolution that the imaging apparatus 101 can exert can be measured based on the contrast information for the edge components of a plurality of rows or columns. Specifically, MTF in the horizontal direction is calculated based on $E1_{H1}$ and $E1_{H2}$, and MTF in the vertical direction is calculated based on $E1_{V1}$ and $E1_{V2}$, among the chart patterns in FIG. 7B.

FIG. 7C is an MTF graph obtained in resolution measurement. In FIG. 7C, the horizontal axis indicates the spatial frequency, and the vertical axis indicates MTF. The MTF graph in FIG. 7C shows the image forming performance within the imaging region, and the image forming performance is a value represented by resolution.

The solid line in FIG. 7C shows MTF that is the image forming performance at the center of the imaging surface, and the dotted line in FIG. 7C shows MTF that is the image forming performance in the peripheral region. Each of the MTFs ($MTF_{h0}$, $MTF_{h1}$) at the center and in the peripheral region of the imaging surface at a predetermined spatial frequency fm are treated as representative resolution information at each of the image heights.

In general, coma aberration, astigmatism, curvature of field, and chromatic aberration of magnification are not defined at the center image height, and they are optical aberrations that increase as the image height increases. All these aberrations cause deterioration in the image forming state and therefore affect the resolution of the image obtained as a result. Therefore, in a peripheral region where the image height is high, a resolution of the image is reduced due to the influence of these aberrations even in a state in which there is no camera shake at all. For example, there is a concern that an evaluation value indicating the presence of blurring is provided to an image of a peripheral region in a stationary state.

When the image stabilization correction effect is evaluated for the image in the central region, it is sufficient to calculate the blur amount by paying attention only to the "out-of-focus offset" in consideration of a low-pass filter effect due to the pixel aperture. However, if the image stabilization correction effect is evaluated in a peripheral region where the image height is high, it is necessary to take into consideration a new out-of-focus offset caused by the above-described aberrations.

Accordingly, performing the resolution measurement prior to the evaluation of the image stabilization effect results in the suppression of the influence of aberration due to the image height. Since the difference in image height in the evaluation results caused by the edge contrast method is canceled by, for example, correcting the blur measurement result by using the information regarding the resolution according to the difference in image height, the blur amount in the peripheral region can be treated as being equivalent to that in the central region. Alternatively, using information regarding resolution according to the difference in image height as reference information and attaching it in association with the evaluation result of the image stabilization effect also results in an appropriate determination for the evaluation in the case in which correction has not been performed.

When the correction is performed by using the information regarding the resolution according to the difference in image height, the ratio ($MTF_{h1}/MTF_{h0}$) of each of the MTFs ($MTF_{h0}$, $MTF_{h1}$) of the center and the peripheral region of the imaging surface at the predetermined spatial frequency fm is calculated. Then, the above ratio of the MTFs is used as correction data and can be multiplied by the blur amount at the evaluation image height for normalization.

The chart used in the above resolution measurement is not limited to the SFR chart 601, and for example, a small hole resolution test chart, which is typically used in resolution measurement, may be used. Additionally, a small point image that forms an image at the level of several pixels may be located at the position of the image height that is desired to be measured, the spread of the point image due to the reduction in resolution may be counted as a blur amount, and correction of the resolution measurement may be performed by subtraction from the evaluation result (blur amount) in the edge contrast method.

(Distortion Measurement)

Figure 8A:
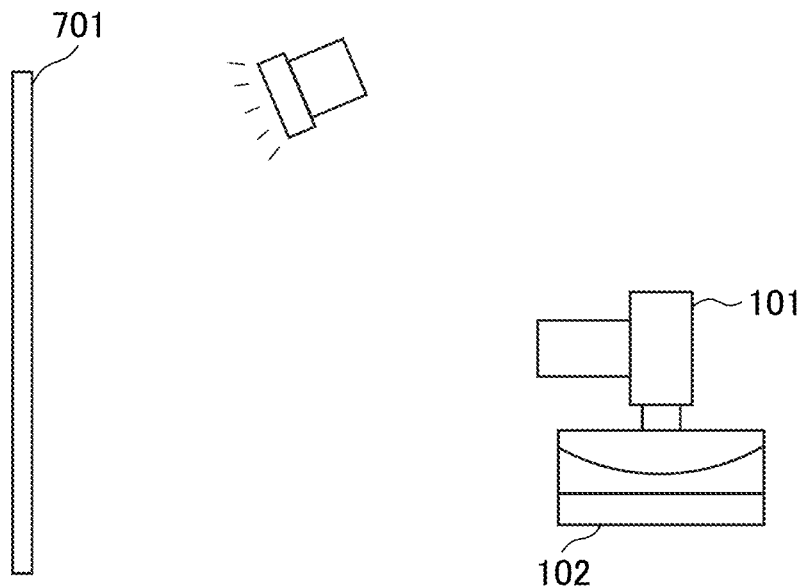
FIGS. 8A and 8B illustrate distortion measurement.
Figure 8B:
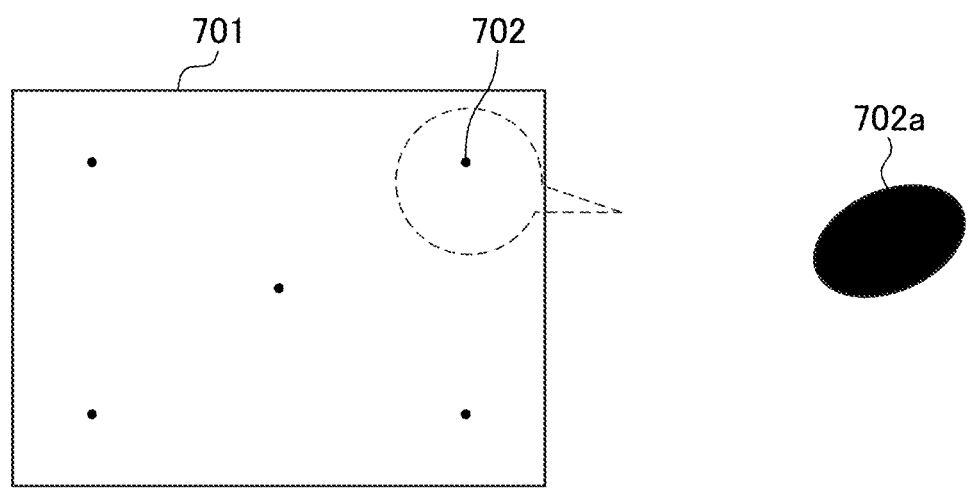

FIGS. 8A and 8B illustrate, from among image height influence measurements, distortion measurement in which the influence of distortion aberrations is measured. FIG. 8A illustrates a schematic view of the distortion measurement.

In the distortion measurement, as shown in FIG. 8A, the imaging apparatus 101, which serves as a device to be measured, and the vibration table 102, in which vibration in the pitch and yaw directions can be performed, are used. In the imaging apparatus 101, a point image chart 701 is imaged and information regarding distortion aberrations in each of the central region and the peripheral region of the imaging apparatus 101 is acquired. In the imaging of the distortion measurement, the point image chart 701 is illuminated under appropriate conditions.

FIG. 8B illustrates an example of the point image chart 701. The point image chart 701 is a chart in which dot-like patterns 702 are aligned and arranged at positions corresponding to the center and peripheral regions in the imaging range, as shown in FIG. 8B. The point image chart that is imaged during the distortion measurement is an example of the second object.

When the imaging optical system of the imaging apparatus 101 has a distortion aberration, a point image 702a (right side in FIG. 8B) in the peripheral region where the image height is high will be a shape that has been deformed to a shape that is radially distorted from the center, instead of being circular, as shown in the drawing. The deformation amount for being deformed to a shape that is radially distorted is measured in a state in which this is added to the blur amount when the blur amount is measured, and this is one of the factors in which the blur amount in the peripheral region is higher than that in the central region.

Figure 9:
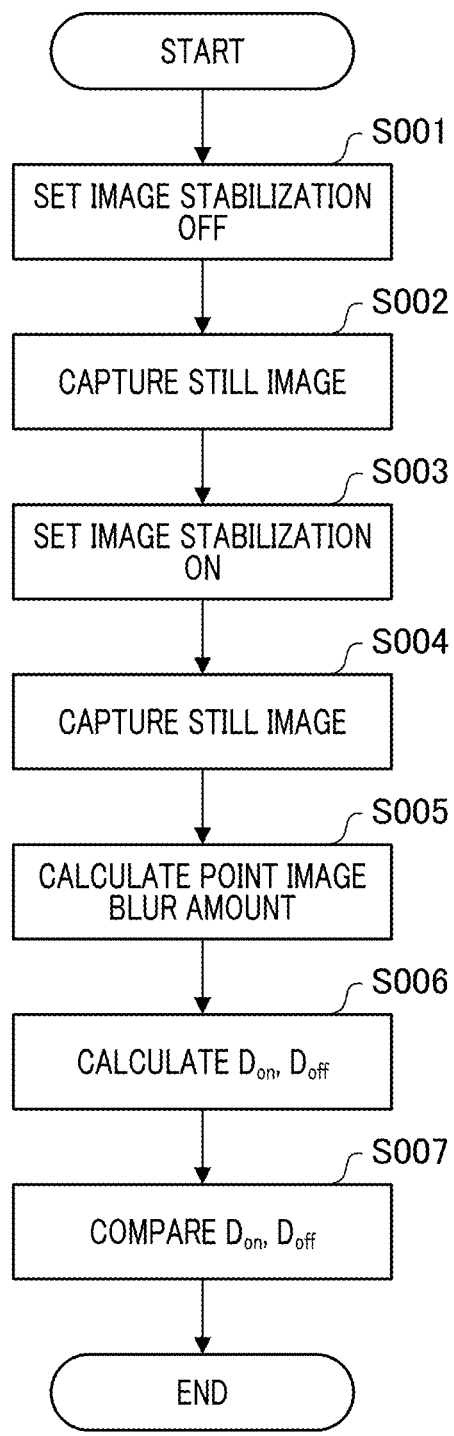
FIG. 9 is a flowchart showing the flow of the distortion measurement.

FIG. 9 is a flowchart showing the flow of the distortion measurement. The flow in FIG. 9 starts in response to an instruction from the measurer when the vibration of the vibration table 102 is started and stabilized. In the flow in FIG. 9, only the condition of the vibration in the yaw direction is shown, for convenience of explanation.

In step S001, the measurer switches the camera shake correction function of the imaging apparatus 101 to a disabled state (image stabilization OFF setting) as a first condition. In step S002, the measurer operates imaging instruction members such as a release button of the imaging apparatus 101 to perform still image capturing at a predetermined shutter speed.

In step S003, the measurer switches the camera shake correction function of the imaging apparatus 101 to an enabled state (image stabilization ON setting) as a second condition. In step S004, the measurer operates imaging instruction members such as the release button of the imaging apparatus 101 to perform still image capturing at a predetermined shutter speed.

In step S005, the measurer calculates the blur amounts for the point images in the central region and the peripheral region with the number of pixels as the unit based on the two types of obtained still images. Specifically, the measurer calculates a blur amount (hereinafter, also referred to as a "first central blur amount") for the point image in the central region and a blur amount (hereinafter, also referred to as a "first peripheral blur amount") for the point image in the peripheral region, based on the still images obtained by the imaging under the first condition. Next, the measurer calculates a blur amount for the point image in the central region (hereinafter, also referred to as a "second central blur amount") and a blur amount for the point image in the peripheral region (hereinafter, also referred to as a "second peripheral blur amount"), based on the still images obtained by the imaging under the second condition.

In step S006, the measurer calculates a first change amount ratio $D_{off}$ (the first peripheral blur amount/the first central blur amount), which is the ratio between the first central blur amount and the first peripheral blur amount when the camera shake correction function is set to a disabled state. Additionally, the measurer calculates a second change amount ratio $D_{on}$ (the second peripheral blur amount/the second central blur amount) that is the ratio between the second central blur amount and the second peripheral blur amount when the camera shake correction function is set to an enabled state.

In step S007, the measurer performs comparison and evaluation of the first change amount ratio $D_{off}$ and the second change amount ratio $D_{on}$. Thus, the description of FIG. 9 ends.

Here, when the first change amount ratio $D_{off}$ and the second change amount ratio $D_{on}$ are substantially equivalent, it is estimated that the imaging apparatus 101 does not perform correction for distortion aberrations in still image capturing. Therefore, in the above-described case, since the blur amount measured at the evaluation image height is influenced by the distortion aberration, it can be understood that a countermeasure that takes into consideration the influence of the distortion aberration is necessary.

For example, since the difference in image height in the evaluation result caused in the edge contrast method is canceled by dividing the blur amount in the evaluation image height by the first variation ratio $D_{off}$, the blur amount in the peripheral region can be treated as equivalent to that in the central region. Alternatively, using information indicating the influence of distortion aberrations as reference information and attaching it in association with the evaluation result of the image stabilization effect also results in an appropriate determination regarding the evaluation in the case in which correction has not been performed.

In contrast, when there is a significant difference between the first change amount ratio $D_{off}$ and the second change amount ratio $D_{on}$, it is estimated that the imaging apparatus 101 performs correction of distortion aberrations in still image capturing. In this case, since a difference in the blur amount due to the distortion aberration is less likely to occur between the central region and the peripheral region, it can be understood that a countermeasure that takes into consideration the influence of the distortion aberration is unnecessary.

Second Embodiment

In the typical evaluation of image stabilization effects, the evaluation value of the blur amount of the entire image is calculated by imaging the black-and-white edges in the central portion of the image while vibrating the imaging apparatus 101 in the yaw direction and the pitch direction on the vibration table 102 and measuring the degree of the spread of the edges. However, when, for example, blurring in the roll direction is further added in addition to blurring in the yaw direction and the pitch direction, and vibration is applied, blurring in which the magnitudes and directions are different occurs in each of the regions of the image. Therefore, it is necessary to calculate the evaluation value by measuring a blur amount in the peripheral portion of the image, in addition to the blur amount in the central portion of the image.

In the case in which the blur amount in the peripheral portion of the image is measured, simply listing evaluation values for each coordinate position is not enough to confirm the fluctuation tendency of the image stabilization effect between each of the regions in the entire screen. Accordingly, an evaluation index in which the difference in blur amount for each coordinate position can be represented is necessary, in addition to the evaluation of blurring in the central portion of the image as in a conventional approach.

In the second embodiment, a description will be given of a method for confirming the fluctuation tendency of the image stabilization effect in the entire screen and calculating an evaluation index in which the difference in the blur amounts for each coordinate position can be represented. In the description of each of the embodiments below, the same reference numerals are provided for the same configurations as those in the first embodiment, and duplicate explanations will be omitted.

Figure 10A:
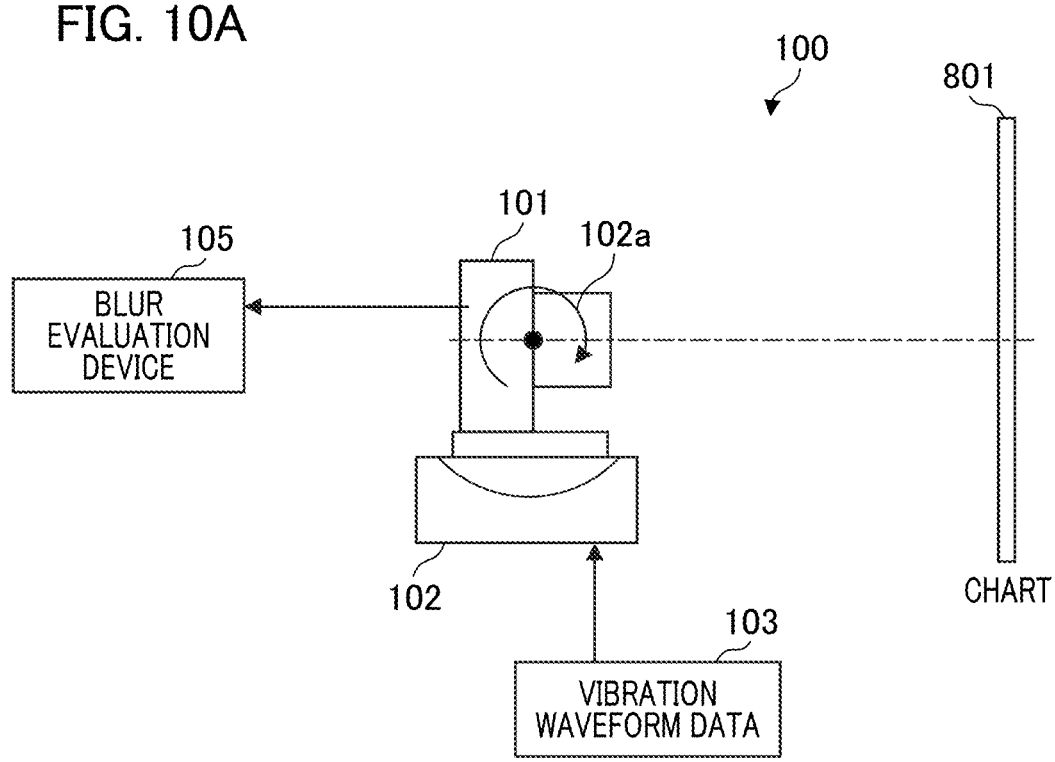
FIG. 10A is a schematic diagram showing an example of a configuration of the evaluation system in the second embodiment.
Figure 10B:
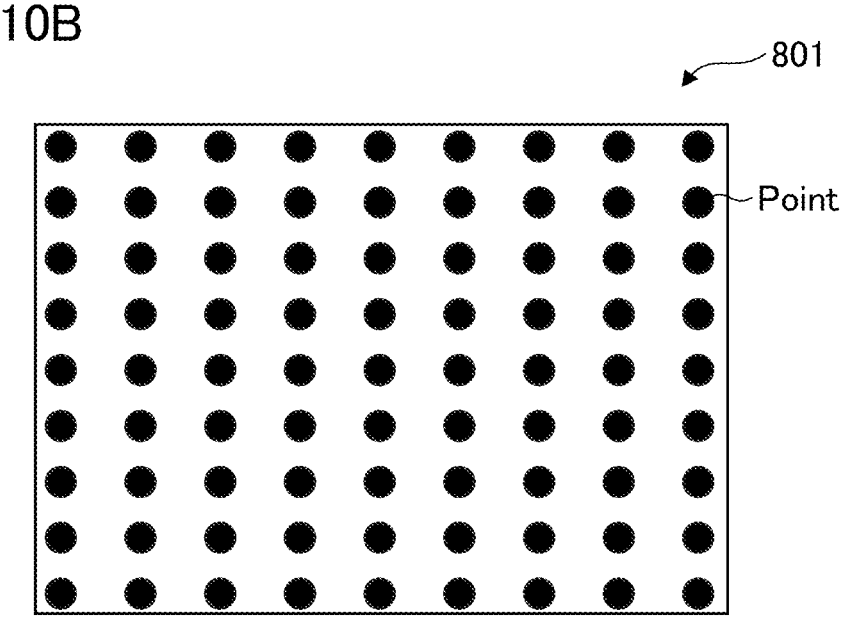
FIG. 10B illustrates an example of a chart in the second embodiment.

FIG. 10A is a schematic view showing an example of a configuration of the evaluation system in the second embodiment. In the second embodiment, the imaging apparatus 101 that is fixed to the vibration table 102 images the point image chart 801 that is disposed to directly face the imaging apparatus 101 to serve as a first object. The point image chart 801 is a chart in which a plurality of point images ("Point" in FIG. 10B) is arranged in a square grating at predetermined intervals in the vertical and horizontal directions, as shown in FIG. 10B.

Next, a generation method for an evaluation value representing the blur amount in the second embodiment will be described with reference to FIGS. 11A and 11B. FIG. 11A shows an example of an image obtained by imaging the point image chart 801. In FIG. 11A, N101 represents an image obtained by imaging the point image chart 801, and N102 to N106 represent captured point images. Reference numeral N102 represents a point image in the central region, and N103 to N106 represent point images in the peripheral region in which the image heights are substantially the same.

Figure 11B:
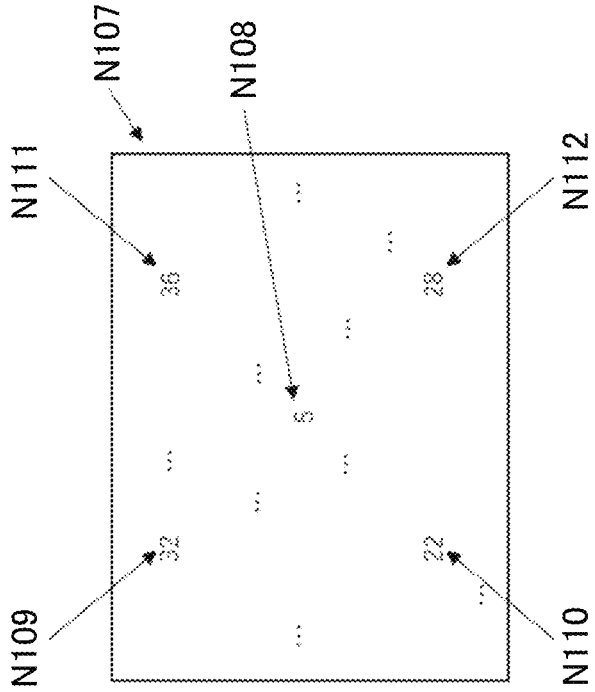
FIG. 11B illustrates an example of a calculation result of a blur amount corresponding to the image in FIG. 11A.
Figure 11A:
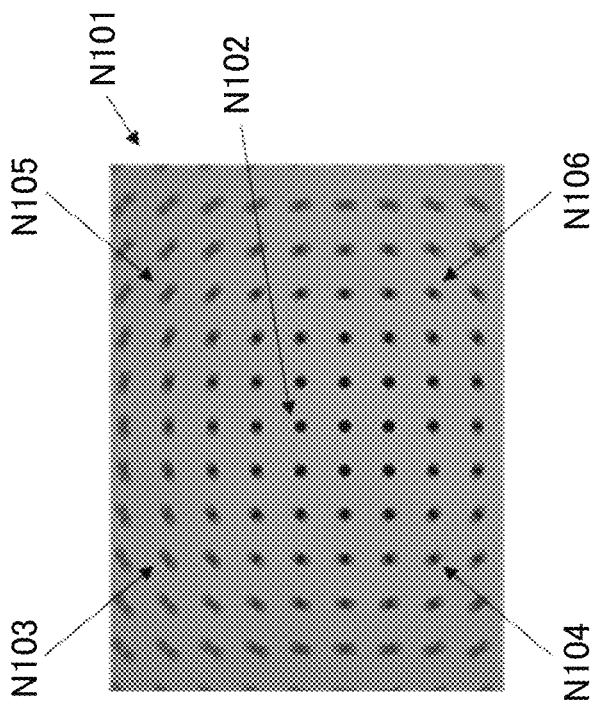
FIG. 11A illustrates an example of an image obtained by imaging a point image chart 801.

FIG. 11B illustrates an example of the calculation result for the blur amount corresponding to the image in FIG. 11A. In FIG. 11B, N107 represents a list of the calculation results for the blur amounts corresponding to the image in N101. N108 represents a blur amount in the central region corresponding to N101, and N109 to N112 respectively represent blur amounts in the peripheral region corresponding to N103 to N106.

Although in N107 in FIG. 11B, the blur amounts N108 to N112 are mapped onto the positions of the points in the image N101 and displayed, the blur amounts N108 to N112 may be displayed in a table format.

In the second embodiment, an evaluation value that indicates the blur amount of the image is generated by calculating the blur amounts in a plurality of peripheral regions at the same image height position and performing statistical processing, which is to be described below. As the statistical processing for generating the evaluation value, for example, any one of the maximum value, the minimum value, the average value and the variance of each of a plurality of calculated blur amounts, or a plurality of types of statistics amounts described above can be used.

As an example, in the second embodiment, an evaluation value indicating the blur amount of the image N101 is calculated by using any one of the maximum value, the minimum value, the average value, and the variance of the blur amounts of N109 to N112 shown in FIG. 11B, or the plurality of types of statistics amounts. The above evaluation value is an example of the first evaluation value, and various types of correction processing can be performed based on the image height influence measurement as described in the first embodiment.

For example, the blur amount in the central region (N108) may be subtracted from each of the blur amounts in the peripheral regions (N109 to N112) before the above statistical processing is performed. Thus, it is possible to calculate a first evaluation value with respect to the blur amount of the roll component that is remarkably exhibited when the image height is high.

Additionally, for example, the average value of the blur amounts in the peripheral region that have been detected at point symmetrical positions with the central region that is the center of the object as reference may be calculated before the above statistical processing is performed. Thus, it is possible to calculate the first evaluation value with respect to the blur amount in the translation direction.

Specifically, the average value of the blur amounts of N109 and N112 that are located at point symmetrical positions around N108 or the average value of the blur amounts of N110 and N111 is calculated, in the example of FIGS.

11A and 11B. Since the roll components of the blur amounts generated in the point images at the point symmetrical positions blur at the same magnitude but in opposite directions, the blurring of the roll components can be canceled by calculating the average value thereof. Thus, it is possible to remove blur in the roll direction and extract the blur amount of the translational component that is not dependent on the image height, as a remaining blur component.

Third Embodiment

The third embodiment is a modification of the second embodiment. In the third embodiment, a heat map is generated by using the blur amount that has been detected from the entire image in which the point image chart 801 has been imaged, and data for the evaluation of the image stabilization effect is generated.

Figure 12A:
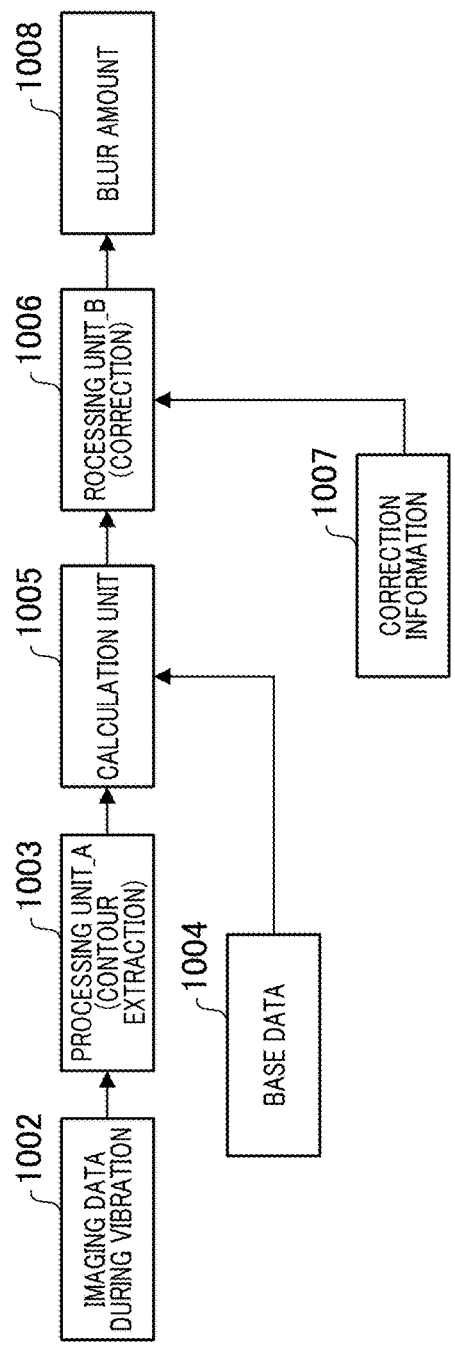
FIG. 12A illustrates an example of software processing for the blur evaluation device in the third embodiment.
Figure 12B:
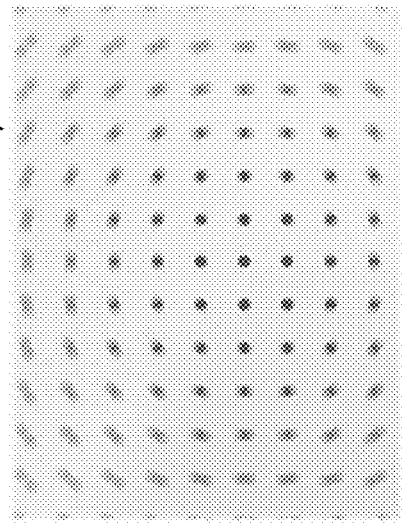
FIG. 12B illustrates an image of a point image chart imaged during vibration.

FIG. 12A illustrates an example of software processing in the third embodiment. Imaging data during a vibration 1002 includes a plurality of image data acquired by imaging the point image chart 801 by the imaging apparatus 101 while the vibration table 102 is set to a vibration state in which vibration is applied in the directions of pitch, yaw, roll, and the like. In the imaging in the vibration state, imaging is performed under a plurality of imaging conditions determined by exposure time or brightness. In FIG. 12B, an image 1009 of a point image chart 801 imaged during vibration is shown.

Figure 12C:
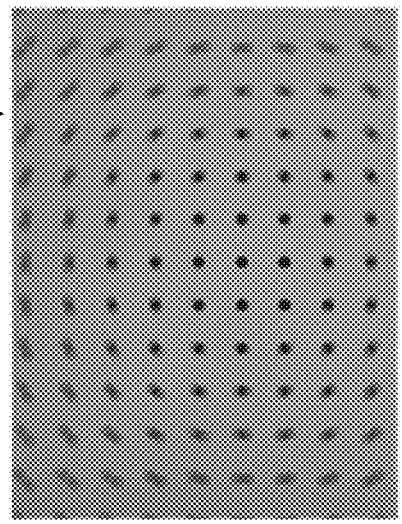
FIG. 12C illustrates an example of information obtained by extracting a contour line of a point image from an image.

A processing unit_A 1003 executes processing for extracting the contour line of the point image based on the image of the imaging data during the vibration 1002. FIG. 12C illustrates an example of information 1010 obtained by extracting the contour line of a point image from the image 1009. Base data 1004 are contour line information of a point image when the point image chart 801 is imaged in a stationary state.

A calculation unit 1005 subtracts the base data 1004 (contour line information of the point image at a stationary time) from the contour line information of the point image during vibration that is generated by the processing unit_A 1003. Thus, the calculation unit 1005 calculates a blur amount, which is a change amount of the point image due to vibration, as the first evaluation value. Note that the calculation unit 1005 calculates the above blur amounts for all the point images in the point image chart 801 and calculates a plurality of blur amounts within the imaging range.

Correction information 1007 is correction information acquired in the image height influence measurement in the first embodiment described above, and includes at least any one of correction information for the luminance distribution measurement, correction information for the resolution measurement, and correction information for the distortion measurement. A processing unit_B 1006 calculates a final blur amount 1008 from which image quality deterioration information other than blurring has been removed by correcting the first evaluation value by using the correction information 1007.

Figure 13A:
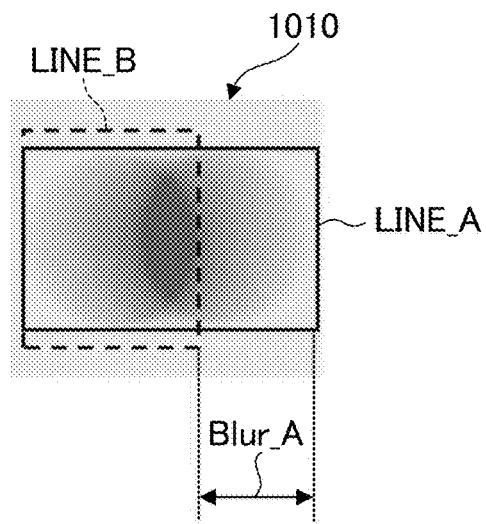
FIGS. 13A to 13C are enlarged diagrams showing the cutout contour line information of the point image in FIG. 12C.
Figure 13B:
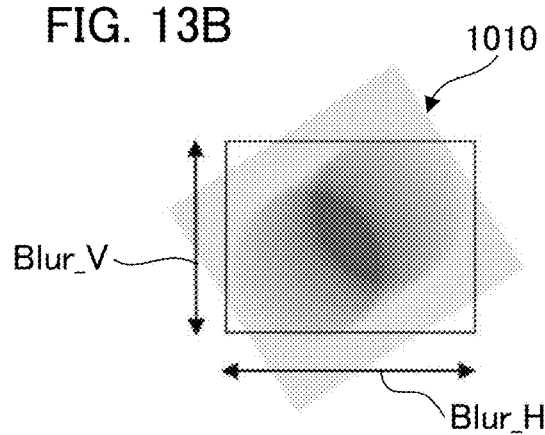
Figure 13C:
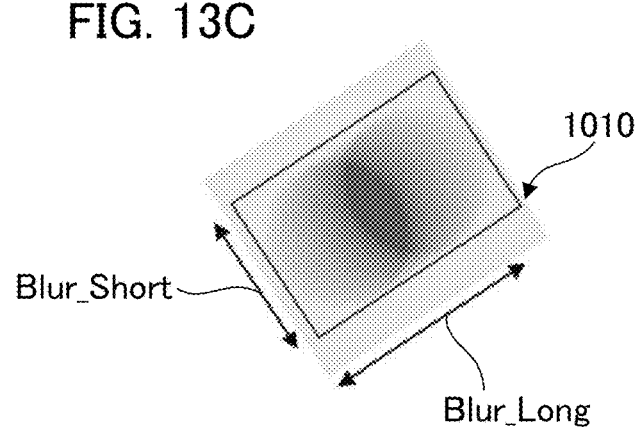

FIGS. 13A to 13C are enlarged views showing the contour line information of an arbitrary point image extracted from the contour line information 1010 shown in FIG. 12C. LINE_A of the solid line portion in FIG. 13A is contour line extraction information for the blurring of the point image. In the extraction of the contour lines, it is possible to perform extraction by calculating the contrast change and detecting a part where the contrast is equal to or less than a threshold described with reference to FIGS. 4A and 4B.

LINE_B of the dashed line in FIG. 13A shows contour line information for the point image chart 801 that was imaged in a stationary state. The contour line information LINE_B is held in advance as base data 1004. Blur_A is the difference between LINE_A and LINE_B and indicates the blur amount in the point image.

The calculation of the blur amount in the third embodiment includes the case of the blurring in the oblique direction in which blurring in the horizontal direction and blurring in the vertical direction are combined, instead of blurring in the horizontal direction or the vertical direction. In the case of blurring in the oblique direction, the blur amount data may be calculated by using Blur_H, which indicates the horizontal direction component of the blurring and Blur_V, which indicates the vertical direction component of the blurring, as shown in FIG. 13B. Alternatively, the blur amount data may be calculated by using Blur_Long, which indicates the longitudinal direction component of the blurring and Blur_Short, which indicates the short direction component of the blurring, as shown in FIG. 13C.

In the third embodiment, a heat map showing the distribution of the out-of-focus amount in the entire imaging region is generated based on the blur amount of the point images discretely arranged in the point image chart 801. Specifically, the out-of-focus amount of a region between adjacent point images is calculated by interpolation processing based on the blur amount between the adjacent point images. It is possible to use the blur amount at an arbitrary coordinate position within the imaging region by performing the interpolation processing on the blur amounts that have been detected discretely. For example, in the case in which the statistical processing in the second embodiment is performed, calculation using the blur amount is enabled even at an image height position where a point image does not exist.

Figure 14:
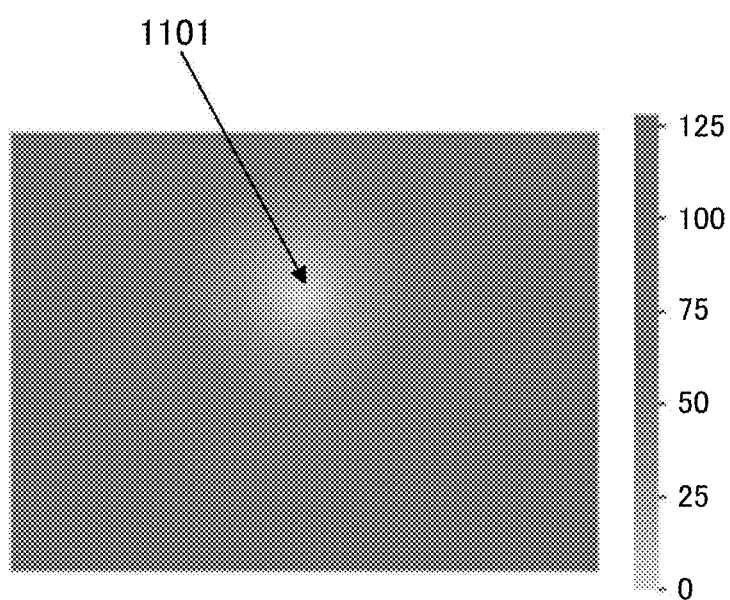
FIG. 14 illustrates an example of a heat map in the third embodiment.

FIG. 14 illustrates an example of the heat map in the third embodiment. In the heat map in FIG. 14, a region where the blur amount is low is expressed in white, and the color becomes darker as the blur amount increases. FIG. 14 illustrates the case in which the blur amount is the lowest in the region near the reference numeral 1101, and the blur amount increases radially around the reference numeral 1101. In this case, in the image of the imaging data during the vibration 1002, a roll blur that is centered at the reference numeral 1101 occurs. Thus, it is possible to intuitively perform the evaluation and comparison of the image stabilization effect for the entire image by performing interpolation processing on the blur amounts that have been detected discretely on the image and visualizing it as a heat map.

In the third embodiment, although an example of generating the heat map based on the magnitude of the blurring as shown in FIG. 14 has been explained, the present invention is not limited to the above explanation. For example, the direction of the blurring may be determined based on a plurality of blur amounts in the entire point image chart 801, and information regarding a blur direction map showing the distribution of the directions of blurring at each position may be generated. It is possible to confirm in which direction the blurring is occurring at each position within the imaging region by mapping the direction of the blurring.

Additionally, the blur amounts in the horizontal direction and vertical direction at the center of the point image chart may be subtracted from a plurality of blur amounts in the entire point image chart 801, and a heat map representing only the blurred component in the roll may be generated.

Thus, although preferred embodiments of the present invention have been described, the present invention is not limited to these embodiments and various modifications and changes are possible within the scope of the gist thereof.

The present invention may also be realized by providing a program that realizes one or more of the functions of the embodiments to a system or a device via a network or storage medium, and reading out and executing the program by one or more processors in the computer of the system or the device. Additionally, the present invention can also be realized by a circuit (for example, ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-001809, filed Jan. 7, 2022 which is hereby incorporated by reference wherein in its entirety.

What is claimed is:

1. An evaluation method for an image stabilization effect of an imaging apparatus,
the evaluation method comprising:
acquiring a first image obtained by imaging an object in a state in which the imaging apparatus is vibrated;
acquiring a second image obtained by imaging the object in a state in which the imaging apparatus is stationary;
calculating an evaluation value indicating an image stabilization effect in a plurality of peripheral regions of the imaging apparatus, by evaluating a difference in blur amounts between the first image and the second image in each of the peripheral regions deviated from the center of an optical axis; and
generating and displaying on a display screen in graphical format an image distinguishably indicating an image stabilization effect in the peripheral regions of the imaging apparatus and an image stabilization effect in a central region of the imaging apparatus based on the evaluation value, wherein the central region includes the center of the optical axis.

2. The evaluation method according to claim 1,
wherein the object includes a first pattern in which contrast in a vertical direction can be detected and a second pattern in which contrast in a horizontal direction can be detected, and
wherein, in the evaluation, the evaluation value is calculated by using a first blur amount of a first peripheral region in which the first pattern is imaged and a second blur amount of a second peripheral region in which the second pattern is imaged.

3. The evaluation method according to claim 2,
wherein the evaluation value includes an evaluation value with respect to a roll blur, and
wherein, in the evaluation, combining processing for combining the first blur amount and the second blur amount is performed, and the evaluation value with respect to a roll blur is calculated.

4. The evaluation method according to claim 1,
wherein, in the evaluation, the evaluation value is calculated by performing statistical processing on blur amounts in the peripheral regions in which the image heights from the optical axis center are the same.

5. The evaluation method according to claim 4,
wherein, in the evaluation, any one of the maximum value, the minimum value, the average value, and the variance of the blur amounts of the peripheral regions is calculated and the statistical processing is performed.

6. The evaluation method according to claim 1,
wherein the object includes a plurality of arrayed patterns, and
wherein, in the evaluation, the evaluation value is calculated based on the blurring of the object at each position in an imaging range of the imaging apparatus, and a map showing the distribution of the evaluation value indicating the image stabilization effect in the peripheral regions is generated.

7. The evaluation method according to claim 1,
wherein, in the evaluation, information indicating at least any one of a luminance change, a change in resolution, and a change in distortion aberration due to a difference in image height from the center of the optical axis of the imaging apparatus is output in association with information regarding the evaluation value.

8. The evaluation method according to claim 1, further comprising:
generating and displaying, based on the calculated evaluation values, a display indicating in different colors or color intensity the comparative image stabilization effect in the peripheral regions of the imaging apparatus to the image stabilization effect in said central region of the imaging apparatus, and further indicating an area with a highest stabilization effect.

9. An evaluation device for an image stabilization effect of an imaging apparatus,
the evaluation device comprising:
a display screen; and
at least one processor, executing computer instructions stored in at least one memory, causing the device to:
operate a first acquisition unit configured to acquire a first image obtained by imaging an object in a state in which the imaging apparatus is vibrated;
operate a second acquisition unit configured to acquire a second image obtained by imaging the object in a state in which the imaging apparatus is stationary;
calculate an evaluation value indicating an image stabilization effect in a peripheral region of the imaging apparatus, based on a difference in blur amounts between the first image and the second image in the peripheral region deviated from the center of an optical axis; and
generate and transmit for display on the display screen in graphical format an image distinguishably indicating an image stabilization effect in the peripheral regions of the imaging apparatus and an image stabilization effect in a central region of the imaging apparatus based on the evaluation value, wherein the central region includes the center of the optical axis.

10. The evaluation device according to claim 9, wherein the processor executing computer instructions causes the device to:
generate and transmit for display, based on the calculated evaluation values, a display indicating in different colors or color intensity the comparative image stabilization effect in the peripheral regions of the imaging apparatus to the image stabilization effect in said central region of the imaging apparatus, and further indicates an area with a highest stabilization effect.

11. A non-transitory storage medium, storing computer instructions that are operated by a computer processor to cause an evaluation device to perform:
acquiring a first image obtained by imaging an object in a state in which an imaging apparatus is vibrated;
acquiring a second image obtained by imaging the object in a state in which the imaging apparatus is stationary;

calculating an evaluation value indicating an image stabilization effect in a peripheral region of the imaging apparatus, based on a difference in blur amounts between the first image and the second image in the peripheral region deviated from the center of an optical axis; and generating and transmitting for display on a display screen in graphical format an image distinguishably indicating an image stabilization effect in the peripheral regions of the imaging apparatus and an image stabilization effect in a central region of the imaging apparatus based on the evaluation value, wherein the central region includes the center of the optical axis.

12. The storage medium of claim 11, wherein the processor executes computer instructions causing the evaluation device to perform:

generating and displaying, based on the calculated evaluation values, a display indicating in different colors or color intensity the comparative image stabilization effect in the peripheral regions of the imaging apparatus to the image stabilization effect in said central region of the imaging apparatus, and further indicating an area with a highest stabilization effect.

* * * * *